US008816980B2

(12) United States Patent
Kanda et al.

(10) Patent No.: US 8,816,980 B2
(45) Date of Patent: Aug. 26, 2014

(54) MOBILE ELECTRONIC DEVICE

(75) Inventors: Atsuhiko Kanda, Daito (JP);
Katsushige Fujii, Daito (JP); Kenji Shiomi, Daito (JP)

(73) Assignee: KYOCERA Corporation, Kyoto (JP)

( * ) Notice: Subject to any disclaimer, the term of this patent is extended or adjusted under 35 U.S.C. 154(b) by 240 days.

(21) Appl. No.: 13/246,310

(22) Filed: Sep. 27, 2011

(65) Prior Publication Data

US 2012/0075222 A1    Mar. 29, 2012

(30) Foreign Application Priority Data

Sep. 27, 2010 (JP) .................................. 2010-215662
Sep. 26, 2011 (JP) .................................. 2011-209034

(51) Int. Cl.
*G06F 3/041* (2006.01)

(52) U.S. Cl.
USPC ........................................................ 345/173

(58) Field of Classification Search
None
See application file for complete search history.

(56) References Cited

U.S. PATENT DOCUMENTS

| 2004/0029546 | A1* | 2/2004 | Tsuchi et al. .............. 455/159.1 |
| 2004/0067778 | A1* | 4/2004 | Sata et al. ..................... 455/566 |
| 2009/0298469 | A1* | 12/2009 | Kim et al. ..................... 455/411 |
| 2010/0080084 | A1* | 4/2010 | Chen et al. ................... 367/118 |
| 2010/0131749 | A1* | 5/2010 | Kim et al. ..................... 713/100 |
| 2010/0302203 | A1* | 12/2010 | Tsuzaki et al. ............... 345/174 |

FOREIGN PATENT DOCUMENTS

JP          10-190786          7/1998

* cited by examiner

*Primary Examiner* — Nicholas Lee

(57) ABSTRACT

A system and method for operating a portable electronic device are disclosed. A detected object is detected when the object is in contact with the device to provide detection results. Whether the device is performing a predetermined function to provide a first determination result and whether the object is in contact with the device based on the detection results to provide a second determination result are then determined. One of a first function and a second function comprising the first function based on the first determination result and the second determination result is then selected. The first function is selected if it is determined that the device is performing the predetermined function and that the object is in contact with mobile terminal. The second function is selected if it is determined that the device is performing the predetermined function and that the object is not in contact with the device.

12 Claims, 10 Drawing Sheets

Yamamoto, __

Duration of the telephone call

00:50

Volume

Yamamoto, __

Duration of the telephone call

00:50

Brightness

MOBILE ELECTRONIC DEVICE

CROSS-REFERENCE TO RELATED APPLICATION

The present application claims priority under 35 U.S.C. §119 to Japanese Patent Application No. 2010-215662, filed on Sep. 27, 2010, entitled "MOBILE TERMINAL" and Japanese Patent Application No. 2011-209034, filed on Sep. 26, 2011, entitled "MOBILE TERMINAL DEVICE". The content of which is incorporated by reference herein in its entirety.

FIELD

Embodiments of the present disclosure relate generally to mobile electronic devices, and more particularly relate to a mobile electronic device comprising a touch panel thereon.

BACKGROUND

Currently, popular mobile phones often have a touch panel. However, touch panels have high power consumption, and there has been a problem in reducing the continuous operating time of mobile phones. Accordingly, as a power-saving technology related to the mobile phones equipped with touch panels, there is a technology in which, for example, the power supply is stopped when it is detected that the mobile phone is held by hand and placed against a user's ear during a telephone call. With such technology, it can be expected that power consumption during the telephone call is reduced and a duration of a telephone call can be prolonged. However, a display screen may not be operable because a power supply to the display screen may be terminated during the telephone call, so various required functions such as volume adjustment and recording functions generally cannot be performed during the telephone call by touch panel operation. Moreover, when performing, for example, volume adjustment or the recording function during the telephone call, it is necessary to move the mobile phone away from the ear before doing so, reducing convenience for the user.

SUMMARY

A portable electronic device is provided in which various functions provided to the portable electronic device are easily performed without deteriorating a convenience for the user even when the user is using the portable electronic device while placing it near or in contact to his/her body.

In one embodiment, a portable electronic device comprises, comprises a proximity detection module, a first determination module, a second determination module, and a function selection module. The proximity detection module is detects a detected object when the detected object is in contact with the portable electronic device to provide detection results. The first determination module determines whether the portable electronic device is performing a predetermined function to provide a first determination result. The second determination determines whether the detected object is in contact with the portable electronic device based on the detection results to provide a second determination result.

The function, selection module selects one of a first function and a second function comprising the first function based on the first determination result and the second determination result. The function selection module also selects the first function if the first determination module determines that the portable electronic device is performing the predetermined function and the second determination module determines that the detected object is in contact with mobile phone. Additionally, the function selection module selects the second function if the first determination module determines that the portable electronic device is performing the predetermined function and the second determination module determines that the detected object is not in contact with the mobile phone.

In another embodiment, a method for operating a mobile phone, detects a detected object when the detected object is in contact with the portable electronic device to provide detection results. It is then determined whether the portable electronic device is performing a predetermined function to provide a first determination result and whether the detected object is in contact with the portable electronic device based on the detection results to provide a second determination result. The method then selects one of a first function and a second function comprising the first function based on the first determination result and the second determination result. Additionally, the first function is selected if it is determined that the portable electronic device is performing the predetermined function, and it is determined that the detected object is in contact with mobile terminal. Also the second function is selected if it is determined that the portable electronic device is performing the predetermined function and it is determined that the detected object is not in contact with the mobile phone.

In yet another embodiment, a computer readable storage medium comprises computer-executable instructions for performing a method for operating a portable electronic device. The method is executed by the compute-executable instructions and detects a detected object when the detected object is in contact with the mobile phone portable electronic device to provide detection results. The method executed by the compute-executable instructions then determines whether the portable electronic device is performing a predetermined function to provide a first determination result and whether the detected object is in contact with the portable electronic device based on the detection results to provide a second determination result.

The method executed by the compute-executable instructions then selects one of a first function and a second function comprising the first function based on the first determination result and the second determination result. Additionally, the first function is selected if it is determined that the portable electronic device is performing the predetermined function, and it is determined that the detected object is in contact with mobile terminal. Also the second function is selected if it is determined that the portable electronic device is performing the predetermined function and it is determined that the detected object is not in contact with the portable electronic device.

BRIEF DESCRIPTION OF THE DRAWINGS

Embodiments of the present disclosure are hereinafter described in conjunction with the following figures, wherein like numerals denote like elements. The figures are provided for illustration and depict exemplary embodiments of the present disclosure. The figures are provided to facilitate understanding of the present disclosure without limiting the breadth, scope, scale, or applicability of the present disclosure.

DETAILED DESCRIPTION

Figure 1A:
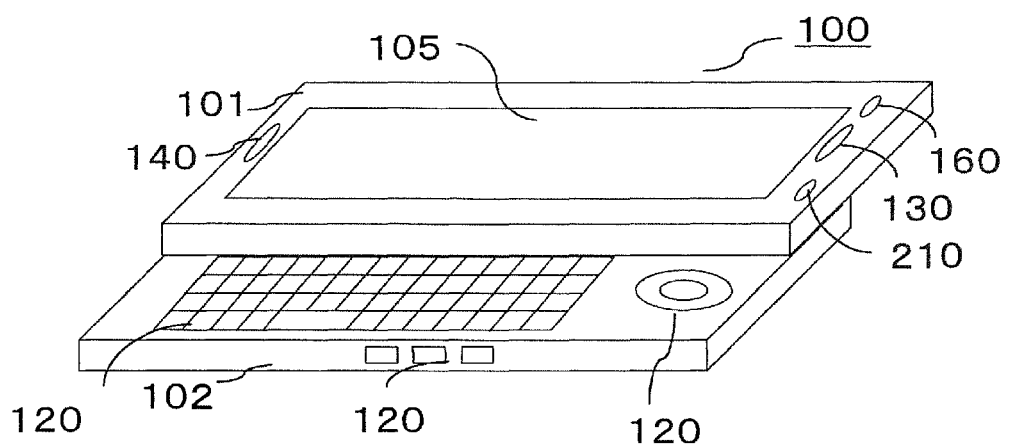
FIG. 1A is an illustration of a perspective view of a mobile phone according to an embodiment of the disclosure.

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. The present disclosure should be accorded scope consistent with the claims, and not limited to the examples described and shown herein.

Embodiments of the disclosure are described herein in the context of one practical non-limiting application, namely, a portable electronic device such as a mobile phone. Embodiments of the disclosure, however, are not limited to such mobile phone, and the techniques described herein may be utilized in other applications. For example, embodiments may be applicable to digital books, digital cameras, electronic game machines, digital music players, personal digital assistance (PDA), personal handy phone system (PHS), lap top computers, TV's, GPS's or navigation systems, pedometers, health equipments, display monitors, and the like.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

As an example of a case in which the user performs a predetermined function on a mobile phone 100 (portable electronic device), a case of performing a telephone call function is described herein. Additionally, a determination of whether a detected object is getting closer to the mobile phone 100 is described herein by specifying a user's ear as the detected object for example. The determination is performed by a determination module 430 while the user is performing the predetermined function.

In the mobile phone 100, a first housing 101 and a second housing 102 are slidably coupled.

The mobile phone 100 also comprises a touch panel 105, an operation module 120, an illumination module 160, a speaker 130, a microphone 140, and a detection module 210, a D/A converter 135, an A/D converter 145, a vibration module 150, a wireless circuit 170, an antenna 175, a capture module 180, a memory module comprising a ROM 190 and/or a RAM 200, and a control module 220.

The touch panel 105 comprises a display control module 106, a display module 110, and a touch panel input module 115.

The display control module 106 controls display of information stored in the ROM 190 and the RAM 200 on the display module 110 based on control signals from the control module 220. The display module 110 displays the information based on the output from the display control module 106. Control functions of the display control module 106 comprise, for example but without limitation, brightness control, contrast control, directional control of displayed information, time control for displaying the information, or other function, when displaying the predetermined information on the display module 110. The display control module 106 also controls a luminance of a backlight provided to the display module 110, switching ON (light on) and OFF (light off) of the backlight, light-up duration of the backlight, or other control.

The display module 110 displays, via the display control module 106, a variety of information and screens to achieve functions provided in the mobile phone 100. Variety of information and screens comprise, for example but without limitation, a function menu, an email, an address book, received telephone calls or dialed telephone calls, transmitted emails or received emails, character data or image data 360 stored in a data folder, or other information. During a telephone call, the display module 110 can display a screen for adjusting a volume, a screen for adjusting the luminance, and a screen on which a mute function and a speaker phone function can be performed as functions related to the telephone call. The display module 110 may comprise for example, but without limitation, a liquid crystal display, an organic Electroluminescent (EL) display, a plasma display, or other display. In the exemplary embodiments describe herein, a liquid crystal display (LCD) is used for the display module 110.

The touch panel input module 115 comprises a pointing device. The touch panel input module 115 detects a position that the user touched using a contact member such as a finger, a pen, or other means, and outputs coordinates corresponding to the position to the control module 220. The touch panel 105 is placed on a top surface of the display module 110. A touch by the user may comprise, for example but without limitation, pressing, stroking, drawing, or other contact, on the touch panel 105 by means of a contact member. That is, the touch panel 105 inputs to the control module 220 the coordinates of the pressed position, the stroke direction, or a symbol drawn by the user. The method of detecting the coordinates by the touch panel 105 comprises, for example but without limitation, a capacitive touch type that detects the change in capacitance caused when the user touches the touch panel 105, a resistive touch type, an optical type, an ultrasonic surface acoustic wave type, an infrared shielding type, an electromagnetic induction type, an image recognition type, or other similar method.

The user operation of touching the touch panel 105 with a finger is called a touch, the operation of removing the finger touched on the surface of the touch panel 105 is called a release, the coordinates indicated by the touch is called a touch point (first position), and the coordinates indicated by the release is called a release point (second position). The operation of moving the finger while touching the surface of the touch panel 105 is called a drag, the operation of moving the finger by a predetermined distance or longer (e.g., 50 pixels) within a predetermined time period (e.g., 50 ms) while touching the surface of the touch panel 105 and releasing the finger is called a flick, and the operations on the touch panel 105 are collectively known as touch operations. In this document, the touch panel input module 115 is sometimes called a contact detection module.

The operation module 120 receives operational inputs from the user. The input received by the operation module 120 is input to the control module 220.

The speaker 130 outputs sounds to outside (e.g., area surrounding the mobile phone housing) based on control signals from the control module 220. The speaker 130 is coupled to the control module 220 via the D/A converter 135.

The D/A converter 135 converts digital signals input from the control module 220 to analog signals. The D/A converter 135 outputs the converted analog signals to the speaker 130.

The microphone 140 inputs sounds such as audio from the outside. The microphone 140 outputs the input sounds to the A/D converter 145 as analog signals. The microphone 140 is connected to the control module 220 via the ND converter 145. The A/D converter 145 converts the analog audio signals input from the microphone 140 to digital signals and outputs them to the control module 220.

The vibration module 150 generates mechanical vibrations by control signals from the control module 220. The vibration module 150 comprises a motor, or other driver, and notifies the user of outgoing or incoming telephone calls, transmission or reception of emails, upcoming alarm date, or other events, by mechanical vibrations.

The illumination module 160 comprises a function to illuminate light to the outside by control signals from the control module 220. The illumination module 160 comprises a light-emitting element such as a light emitting diode (LED), and notifies the user of outgoing or incoming telephone calls, transmission or reception of emails, replay of a recorded message, replay of music data, upcoming alarm date, or other notification, by illuminating light to the outside.

The wireless circuit 170 performs wireless communications. Outgoing call processing is specifically described herein. The wireless circuit 170 outputs the outgoing telephone call signals via the antenna 175 based on a command from the control module 220. The outgoing telephone call signals are sent to the callee via a base station and a communication network (not shown). Then, once the incoming call processing is performed in the callee's telephone, a communication-enabled state is established, and the control module 220 performs telephone call processing.

A telephone call processing is described below. When there is an incoming call from another telephone, the wireless circuit 170 performs demodulation processing and decoding processing on the predetermined high-frequency signals input from the antenna 175 and converts them to digital audio signals, based on the control signals from the control module 220. The digital audio signals are converted to analog audio signals by the D/A converter 135, and audio is output from the speaker 130. On the other hand, the analog audio signals input through the microphone 140 are converted to digital audio signals by the ND converter 145 and than output to the control module 220. The digital audio signals are subject to encoding processing and modulation processing by the wireless circuit 170 based on a command from the control module 220, and converted to predetermined high-frequency signals. The predetermined high-frequency signals are output via the antenna 175, and sent to the callee's telephone via the base station and the communication network.

An incoming call processing is described below. When outgoing call signals from callee's telephone are received by the antenna 175, the wireless circuit 170 notifies the control module 220 of the incoming telephone call. Accordingly, the control module 220 controls the display control module 106 to display on the display module 110 the information such as the caller's telephone number comprised in the incoming call notification. At approximately the same time as this processing, the control module 220 notifies the user of the incoming call by a predefined method by controlling the speaker 130, the vibration module 150, the illumination module 160, or other notification method. Then, once the user performs the responding operation for the incoming call by controlling the operation module 120 or the touch panel 105, the wireless circuit 170 performs incoming telephone call processing to establish the telephone call-enabled state, based on the command from the control module 220. The control module 220 then performs the above-described telephone call processing. When the operation related to call-ending is performed by operating the operation module 120 or the touch panel 105 in the telephone call-enabled state, the control module 220 controls the wireless circuit 170 to send a signal for ending the telephone call to the other party's telephone and ends telephone call processing. Similarly, also when the signal for ending the telephone call is received by the callee's telephone or the base station, the control module 220 may end the telephone call processing.

The antenna 175 receives electromagnetic waves of a predetermined frequency and outputs them to the wireless circuit 170 as high-frequency signals. Moreover, the antenna 175 outputs high-frequency signals output from the wireless circuit 170 as electromagnetic waves of a predetermined frequency.

Figure 1B:
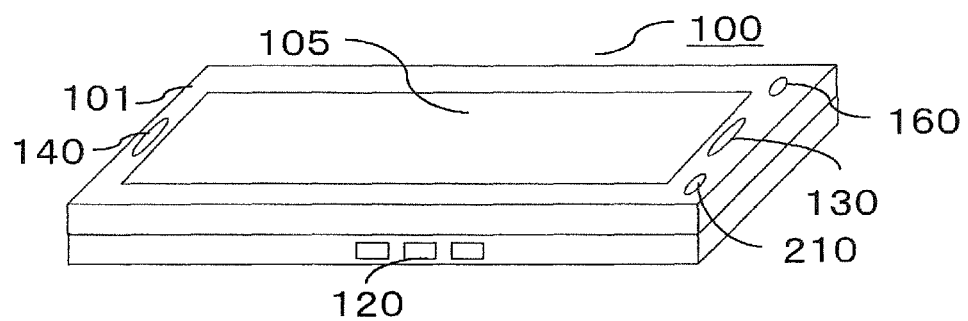
FIG. 1B is an illustration of a perspective view of a mobile phone according to an embodiment of the disclosure.
Figure 2:
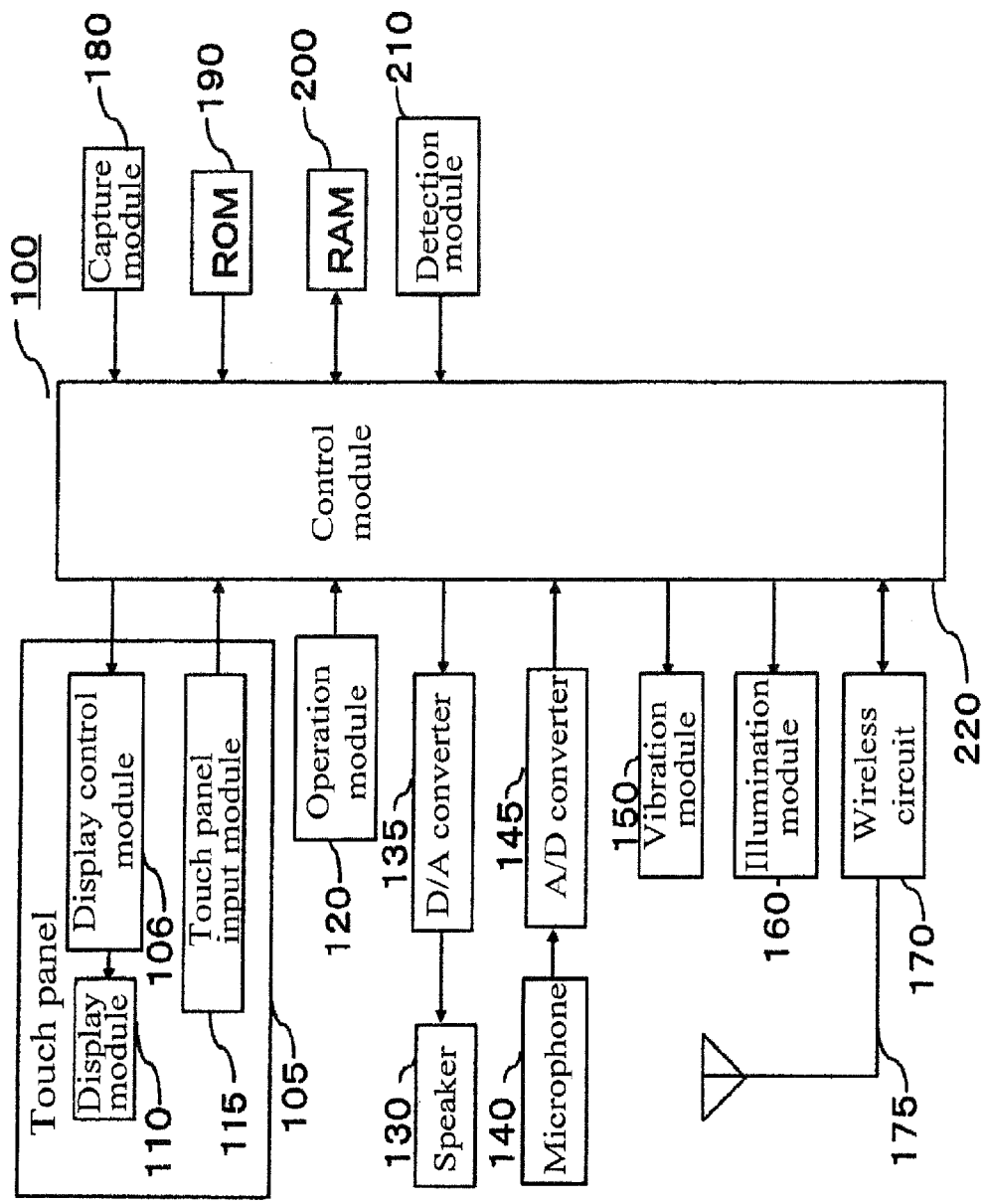
FIG. 2 is an illustration of an exemplary functional block diagram of a mobile phone according to an embodiment of the disclosure.

The capture module 180 acquires images as electronic data. Images acquired by the capture module 180 are stored in the ROM 190 or RAM 200. The capture module 180 comprises a CCD camera, a CMOS camera, or other camera. The capture module 180 is not shown in FIG. 1 because it is located on the back side of the mobile phone 100.

The ROM 190 stores a program, data, or other item for performing various functions provided in the mobile phone 100.

The control module 220 can access the RAM 200, and the RAM is utilized as a temporary storage area (also referred to as a buffer area) for the control module 220 to perform various functions.

The detection module 210 detects that the mobile phone 100 has come in contact with or proximity to the detected object (e.g., an ear). In this document, the contact and proximity may be collectively called contact. The detection module 210 comprises, for example but without limitation, a proximity sensor, ultrasonic and induction proximity sensor, or other sensor. In the proximity sensor, the capacitance is increased when the detected object comes in contact with or proximity to the sensor. When the capacitance exceeds a threshold, the proximity sensor outputs proximity signals to the control module 220.

The proximity sensor discontinues outputting when the detected object is away from the mobile phone 100 and is no longer in the proximity thereof. The proximity sensor may be located anywhere on the mobile phone 100 as long as it is in a position such that it can substantially precisely detect that the user is using the mobile phone 100 while placing it against the user's ear. In this document, the detection module 210 is sometimes called a proximity detection module. The detection module 210 may also be configured to determine whether or not the mobile phone 100 is in contact with or proximity to a part of the body of the user, instead of determining whether or not it is used while being placed against the ear.

The control module 220 controls software and hardware provided in the mobile phone 100. For example, the control module 220 performs various functions provided in the mobile phone 100 based on the input received by the operation module 120 or the touch panel 105 from the user. Moreover, the control module 220 cooperates with the ROM 190 and RAM 200 to execute programs stored in the mobile phone 100.

The data and programs stored in the mobile phone 100 are described below in connection to FIG. 3.

Figure 3:
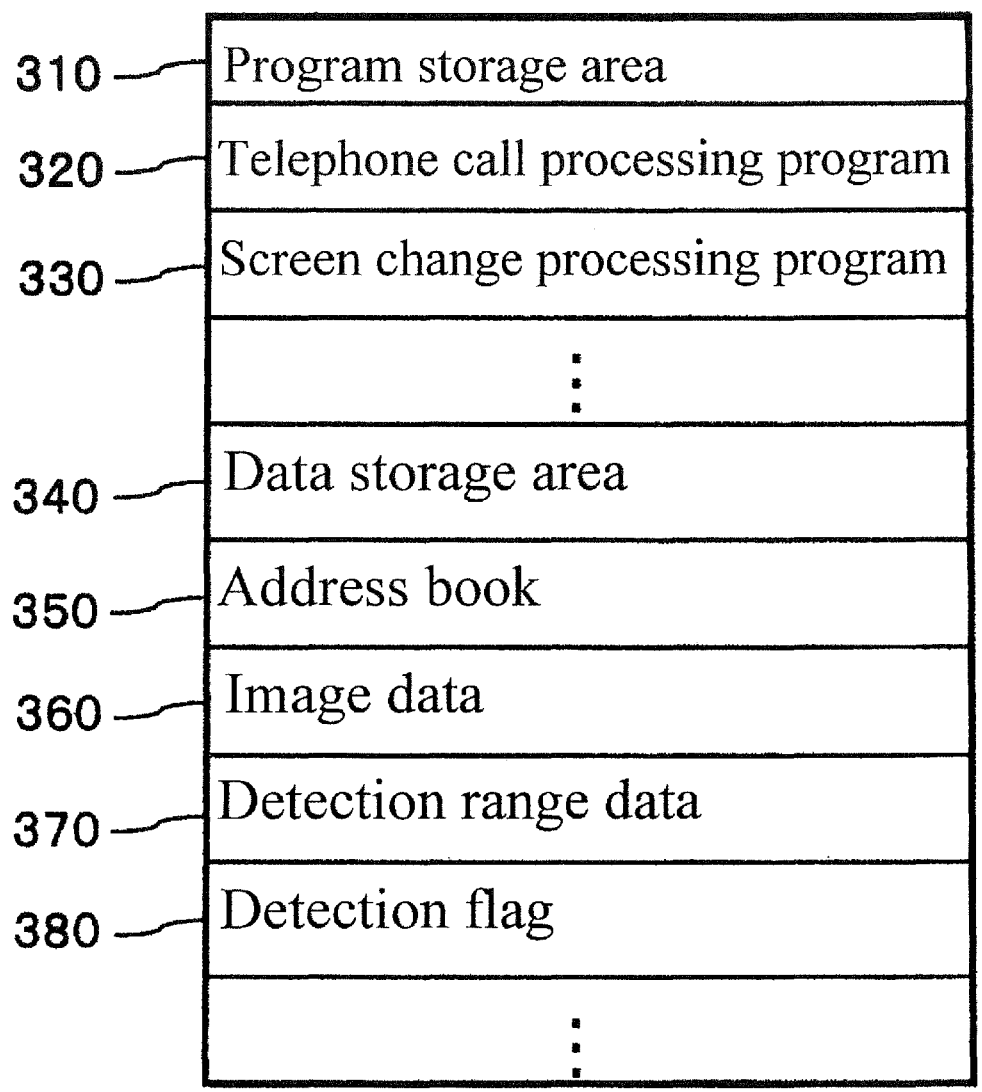
FIG. 3 is an illustration of an exemplary memory map stored in a ROM of a mobile phone according to an embodiment of the disclosure.

FIG. 3 shows an arrangement of information (referred to as a memory map) stored in the ROM 190. The memory map comprises a program storage area 310 for storing programs for cooperating with the control module 220 to perform various functions, and a data storage area 340 utilized for a variety of functions. The program storage area 310 comprises, for example but without limitation, a telephone call processing program 320, or other application program.

The telephone call processing program 320 is processed by a telephone call processor 410. The telephone call processing program 320 performs starting and ending of telephone calls based on an input from the user to the operation module 120 or the touch panel 105.

A screen change processing program 330 is processed by a screen change processor 420. The screen change processing program 330 activates, processing for displaying on the display module 110 a screen that allows the various functions provided in the mobile phone 100 to be performed without requiring the user to remove the mobile phone 100 from the his/her ear, when the mobile phone 100 is used while being placed against the user's ear during the telephone call. The screen change processing program 330 activates processing for displaying on the display module 110 a screen that allows the selection of more functions than when the mobile phone 100 is placed in proximity to the user's ear, when the user removes the mobile phone 100 from his/her ear during the telephone call An address book 350 stores address information input by user operations. The address information may comprise, for example but without limitation, telephone numbers, email addresses, or other information such as names, memory numbers, physical addresses, birth dates, groups (e.g., information related to school or position in a workplace), or other data associated with the telephone numbers or email addresses.

The image data 360 comprises data of a screen displayed on the display module 110 when using the mobile phone 100 while placing it against the user's ear (hereinafter referred to as screen 1 or first information or a first screen), and a screen displayed on the display module 110 when not using the mobile phone 100 while placing it against the ear (hereinafter referred to as screen 2 or second information or a second screen), etc.

On the first screen (FIG. 5A), a volume of the sound output from the speaker 130 can be adjusted. When "+" displayed on the screen is selected, the volume of the sound output from the speaker can be increased, and when "−" is selected, the volume of the sound output from the speaker can be decreased. When "Set Back" is selected, the adjusted volume can be returned to the preset volume.

On the first screen (FIG. 5B), the luminance (also referred to as brightness) can be adjusted. When the object specified with • (filled circle) displayed on the screen is slid to the + (plus) side, the brightness of the screen can be increased, and when the circle is slid to the − (minus) side, the brightness of the screen can be decreased.

On the second screen, performing the speaker phone function, performing the mute function, ending the telephone call, etc. can be selected. The speaker phone function comprises functions to output sounds to the outside by outputting sounds from the speaker 130 provided on the back of the mobile phone 100 that is not shown. When the speaker phone function is utilized, a telephone call can be made while holding the mobile phone 100 without placing the mobile phone 100 closer to the user's ear.

Figure 5A:
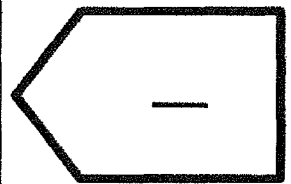
FIGS. 5A to 5C are illustrations of display examples displayed on a display module of a mobile phone according to an embodiment of the disclosure.
Figure 5A:
Figure 5A:
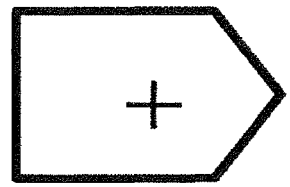
Figure 5B:
Figure 5C:
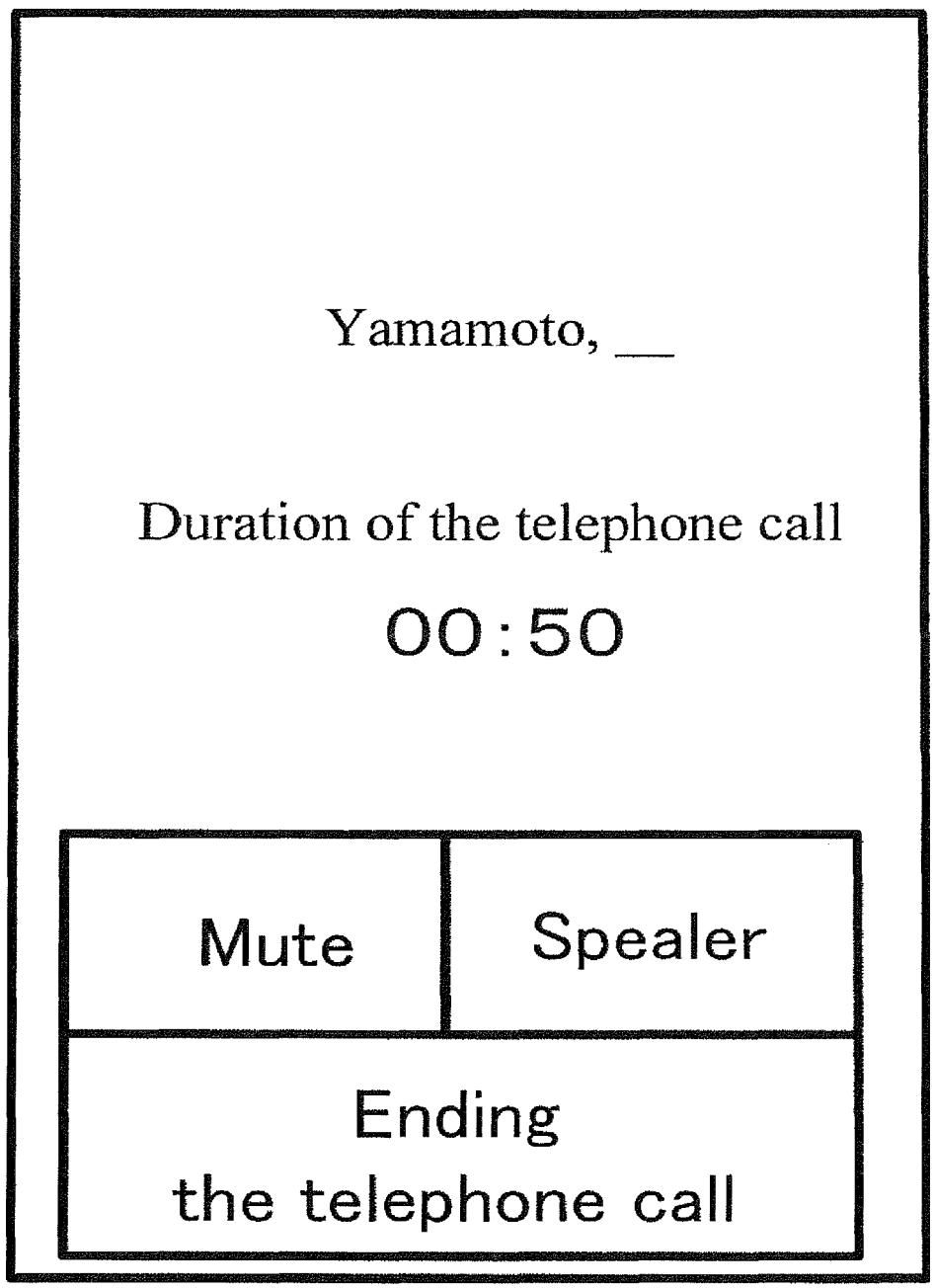

The speaker phone function can be performed by touching "Speaker" on the screen as in FIG. 5C displayed on the touch panel 105. The mute function comprises the function to restrict the output of sounds which are input from the microphone 140, to the speaker of the callee's phone. The mute function can be performed by touching "Mute" on the screen as in FIG. 5C displayed on the touch panel 105. When ending the telephone call is selected by the touch panel 105, the telephone call is ended.

Detection range data 370 stores a reception range of inputs from the touch panel 105. The detection range data 370 stores a range to invalidate the input to the module of the touch panel 105 that the user's ear contacts during the telephone call. The touch panel 105 accepts inputs to the module within the range in which the input is valid (valid contact) based on the detection range stored in the detection range data 370. Outside the range the input is invalid (invalid contact).

A detection flag 380 determines whether or not the mobile phone 100 is used while being placed against the user's ear. The detection flag 380 is composed of a 1-bit register. When the detection flag 380 is turned on (established), i.e., when the determination module 430 determines that the mobile phone 100 is close to the ear based on the detection results from the detection module 210, the register specifies the data value "1." When the detection flag 380 is turned off (not established), i.e., when it is determined that the mobile phone 100 is away from the user's ear based on the detection results from the detection module 210, the register specifies the data value "0."

Programs and data other than the above required for performing various functions provided in the mobile phone 100 may also be stored in the program storage area 310 and the data storage area 340.

Figure 4:
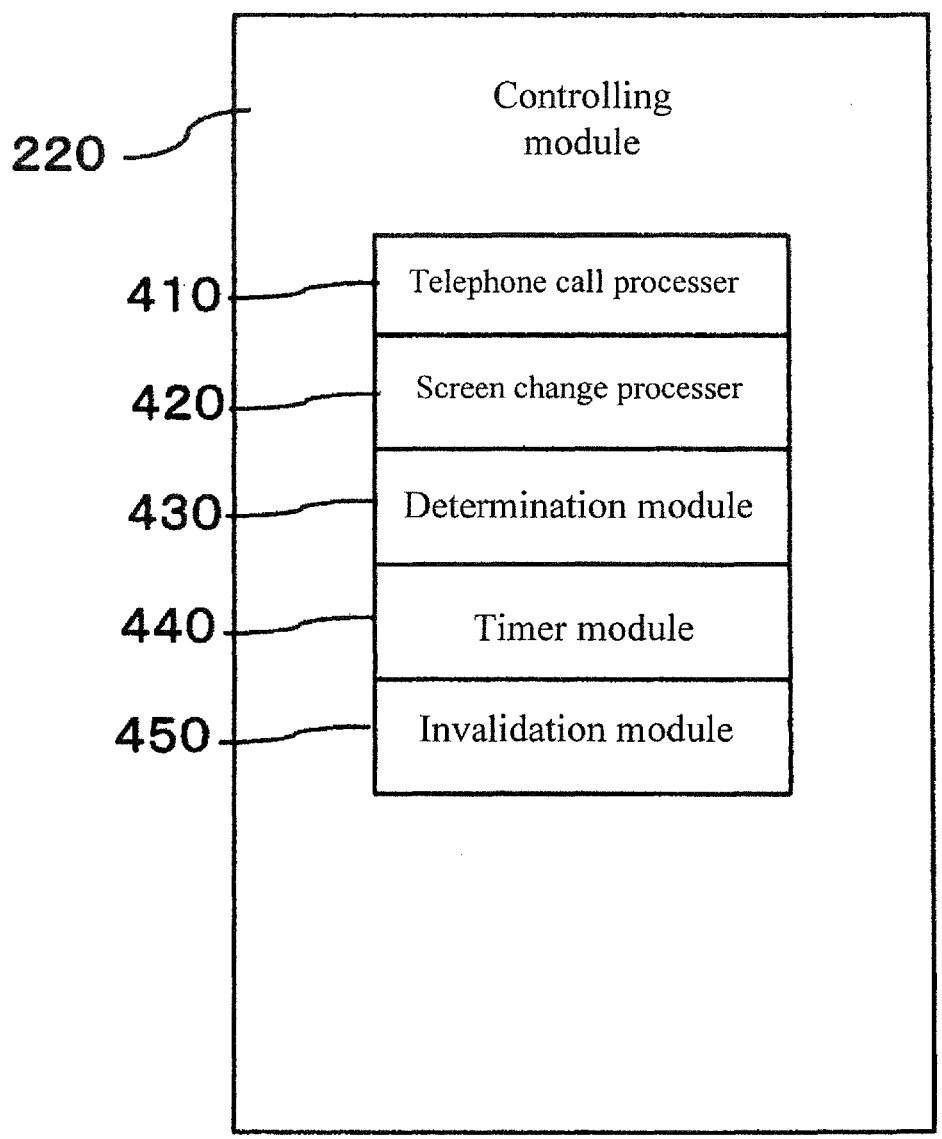
FIG. 4 is an illustration of an exemplary control module of a mobile phone according to an embodiment of the disclosure.

Next, a configuration provided in the control module 220 in order to perform various functions stored in the mobile phone 100 is described in relation to FIG. 4.

The control module 220 comprises the telephone call processor 410, the screen change processor 420, the determination module 430, and a timer module 440.

The telephone call processor 410 executes the telephone call processing program 320 stored in the ROM 190.

The screen change processor 420 executes the screen change processing program 330 stored in the ROM 190.

The determination module 430 determines whether or not the mobile phone 100 is used while being placed against the user's ear based on the detection results detected by the detection module 210. Moreover, the determination module 430 determines whether or not the touch operation has been carried out within a predetermined time period based on the measurement results by the timer module 440. It is determined which function provided to the mobile phone 100 is specified to be performed by the input from the user accepted by the operation module 120 or the touch panel 105.

The determination module 430 comprises a function selection module (not shown) for selecting the first function or second function provided in the mobile terminal. The function selection module selects which of the first function and the second function is to be displayed on the display module 110 based on the determination results of the first determination module and the second determination module.

For example, the determination module 430 determines whether or not the input from the user accepted by the operation module 120 or the touch panel 105 is an input for opening the address book 350, starting the telephone call, ending the telephone call, or other input. The determination module 430 comprises the first determination module that determines whether or not the predetermined function is being performed and the second determination module that determines whether or not the mobile phone 100 is being used while being placed against the ear.

The predetermined function comprises, for example but without limitation, a telephone call function, music replay function, recorded message replay function, message recording function, answering machine replay function, answering machine recording function, volume adjusting function, or other function. If a screen on which the volume can be adjusted is displayed on the display module 110 while replaying a recorded message, the user can adjust the volume of the recorded message output from the speaker 130 while listening to the recorded message without the troublesome operation of placing the mobile phone 100 away from the ear.

The determination module 430 may also determine whether or not the mobile phone 100 is in contact with or proximity to a part of the user's body, instead of determining whether or not it is used while being placed against the ear.

The timer module 440 comprises a timer for counting a given length of time (e.g., 10 seconds). The timer module 440 starts counting when initialized. The timing of initialization is when there is no operation provided to the mobile phone 100 for a given length of time.

An invalidation module 450 performs processing to invalidate the input by contact outside the detection range on the touch panel based on the detection range stored in the detection range data. Invalidating means restricting output of the input signal to the control module 220.

The control module 220 may comprise a configuration other than the configuration shown in FIG. 4 for performing various functions provided in the mobile phone 100.

Next, the telephone call processing program 320 executed by the telephone call processor 410 is described in connection to FIG. 6.

The various tasks performed in connection with the process 600 may be performed by software, hardware, firmware, a computer-readable medium having computer executable instructions for performing the process method, or any combination thereof. The process 600 may be recorded in a computer-readable medium such as a semiconductor memory, a magnetic disk, an optical disk, and the like, and can be accessed and executed, for example, by a computer CPU such as the control module 220 in which the computer-readable medium may be stored.

Figure 6:
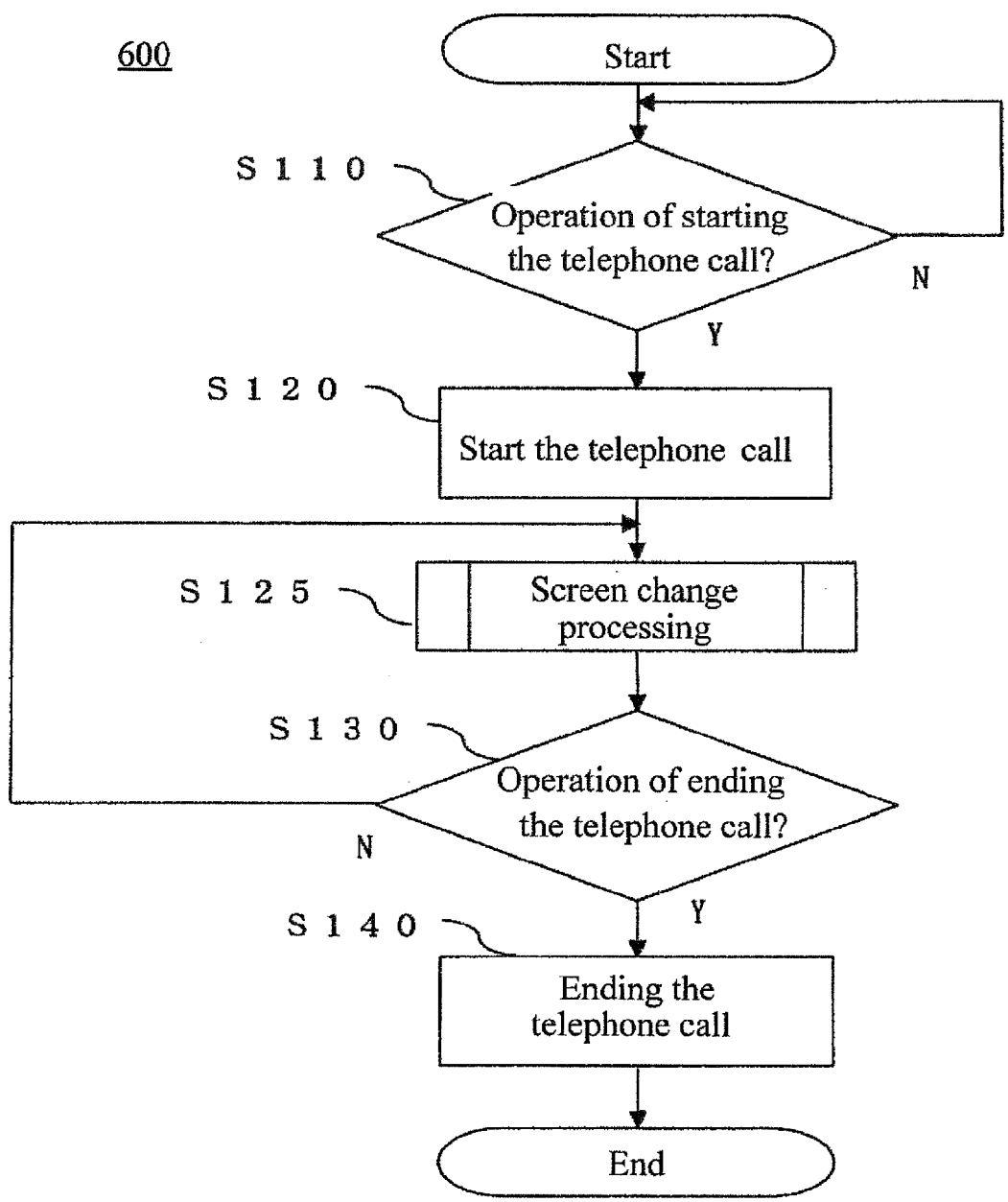
FIG. 6 is an illustration of a flow diagram of a call processing in a mobile phone according to an embodiment of the disclosure.

It should be appreciated that process 600 may include any number of additional or alternative tasks, the tasks shown in FIG. 6 need not be performed in the illustrated order, and process 600 may be incorporated into a more comprehensive procedure or process having additional functionality not described in detail herein. In practical embodiments, portions of the process 600 may be performed by different elements of the mobile phone 100, such as: the touch panel 105, the operation module 120, the illumination module 160, the speaker 130, the microphone 140, the detection module 210, the control module 220, or other module.

In the telephone call processing program 320, the determination module 430 first determines whether or not there has been an operation for starting the telephone call from the touch panel 105. The operation of starting the telephone call comprises the operation of responding to the incoming call and the operation of selecting a telephone number to start the outgoing telephone call (task S110).

The telephone call processing program 320 waits until the user performs the operation of starting the telephone call on the operation module 120 or the touch panel 105.

When the determination module 430 determines that the operation of starting the telephone call has been performed, the telephone call processing program 320 establishes a telephone call state with the other callee's phone and starts the telephone call (task S120).

Next, the screen change processor 420 executes the screen change processing program 330 (task S125). The screen change processing program 330 is described in more detail below in the context of discussion of FIG. 6.

After executing the screen change processing program 330, the determination module 430 determines whether or not the operation of ending the telephone call on the touch panel 105 or the operation module 120 (task S130) has been performed.

When the determination module 430 determines that the operation of ending the telephone call has been performed on the touch panel 105 or the operation module 120 (task S130: "YES"), the telephone call processor 410 discontinues the telephone call-enabled state with the callee's phone to end the telephone call (task S140).

When the determination module 430 determines that the operation of ending the telephone call is not performed on the touch panel 105 or the operation module 120 (task S130: "NO"), the processing in task S130 is performed once again.

Next, the screen change processing program 330 executed by the screen change processor 420 is described in connection to FIG. 7.

The various tasks performed in connection with the process 700 may be performed by software, hardware, firmware, a computer-readable medium having computer executable instructions for performing the process method, or any combination thereof. The process 700 may be recorded in a computer-readable medium such as a semiconductor memory, a magnetic disk, an optical disk, and the like, and can be accessed and executed, for example, by a computer CPU such as the control module 220 in which the computer-readable medium may be stored.

Figure 7:
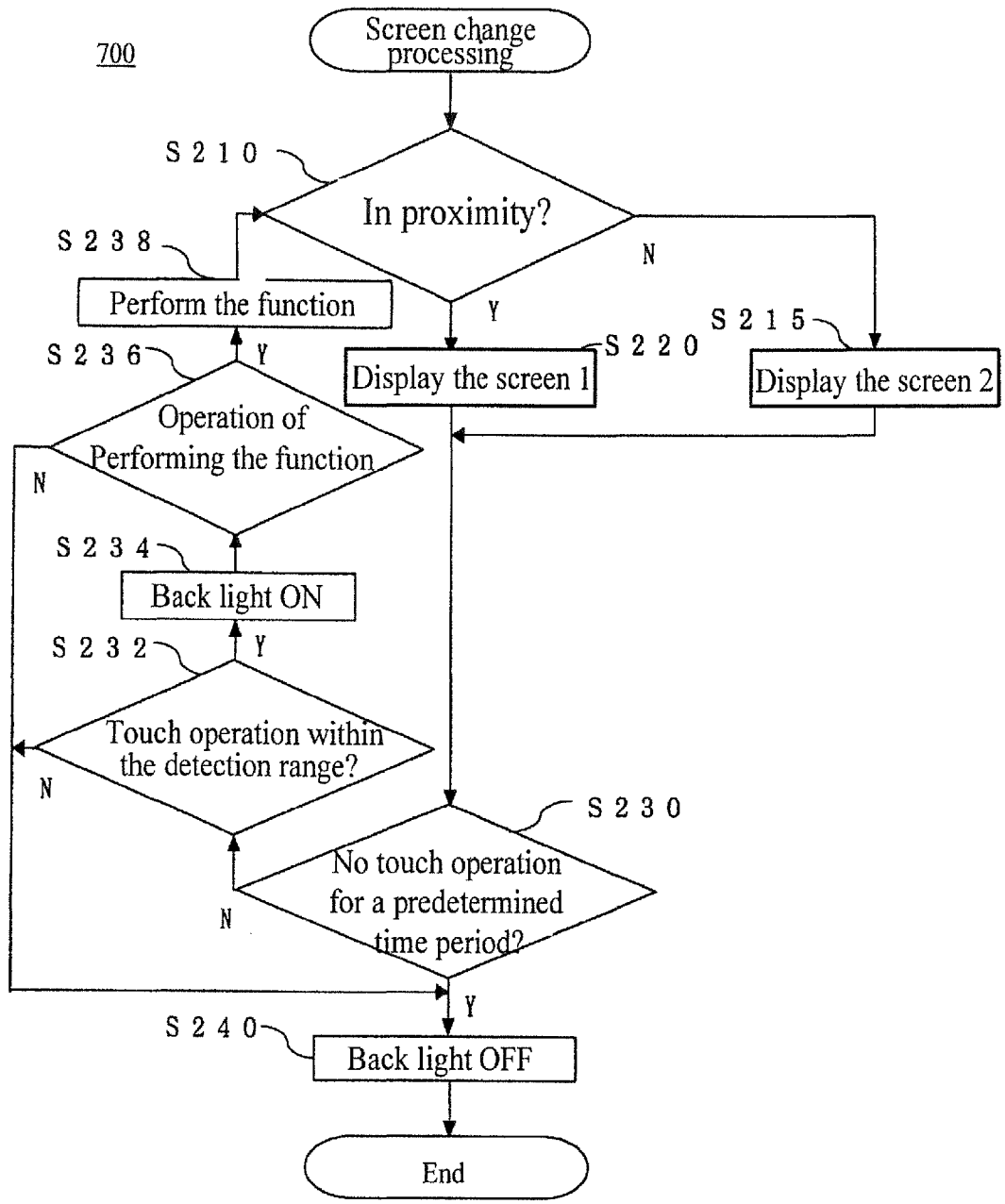
FIG. 7 is an illustration of a flow diagram of a display change processing in a mobile phone according to an embodiment of the disclosure.

It should be appreciated that process 700 may include any number of additional or alternative tasks, the tasks shown in FIG. 7 need not be performed in the illustrated order, and process 700 may be incorporated into a more comprehensive procedure or process having additional functionality not described in detail herein. In practical embodiments, portions of the process 700 may be performed by different elements of the mobile phone 100 such as: the touch panel 105, the operation module 120, the illumination module 160, the speaker 130, the microphone 140, the detection module 210, the control module 220, or other module.

In the screen change processing program 330, the determination module 430 first determines whether the mobile phone 100 is used while being placed against the ear (task S210).

When the determination module 430 determines that the mobile phone 100 is not being used while placed against the ear (task S210: "NO"), the screen change processor 420 displays the screen 2 as in FIG. 5C on the display module 110 (task S215). Along with the processing in task S215, the screen change processor 420 sets the detection flag 380 to ON.

On the other hand, when the determination module 430 determines that the mobile phone 100 is being used while placed against the ear (task S210: "YES"), the telephone call processing program 320 displays the screen 1 on the display module 110 (task S220).

Along with the processing in task S220, the screen change processor 420 sets the detection flag 380 to ON.

Next, the determination module 430 determines whether or not there has been a touch operation within a predetermined time period based on the measurement results of the timer module 440.

When it is determined that there has not been a touch operation within a predetermined time period based on the measurement results of the timer module 440 (task S230: "YES"), the screen change processor 420 performs processing for turning OFF the back light (task S240).

When there has been a touch operation within a predetermined time period based on the measurement results of the timer module 440 (task S230: "NO"), the determination module 430 then determines whether or not the touch operation on the touch panel 105 has been performed within the detection range stored in the detection range data 370 (task S232).

When the determination module 430 determines that the touch operation on the touch panel 105 has not been performed within the detection range stored in the detection range data 370 (task S232: "NO"), the telephone call processor 410 turns OFF the back light (task S240).

When the determination module 430 determines that the touch operation on the touch panel 105 has been performed within the detection range stored in the detection range data 370 (task S232: "YES"), the telephone call processor 410 turns ON the back light (task S234), and determines whether or not the touch operation is the operation of selecting the function displayed on the display module 110 (task S236).

When the determination module 430 determines that the touch operation is the operation of selecting the function displayed on the display module 110, the function is performed based on the input of the touch operation (task S238).

When it is determined that the touch operation is not the operation of selecting the function displayed on the display module 110, the back light is turned OFF (task S240).

The above-mentioned example is one exemplary embodiment related to the mobile phone 100 of the present disclosure, but it can be modified as necessary within the scope described in the embodiment of the present disclosure.

In one embodiment, for example, although a proximity sensor is provided as the detection module 210 that detects whether or not the detected object is in contact with or proximity to the mobile phone 100, an illuminance sensor may be provided as the detection module 210 in place of the proximity sensor. In this case, a value provided with a given allowance for the surrounding illuminance before starting the telephone call and the illuminance when the detected object is in proximity to the mobile phone 100 is stored in the ROM 190 beforehand. A given allowance is a measured illuminance provided with a range of ± a small %.

If during the telephone call, the illuminance measured by the illuminance sensor is a value within the illuminance allowance when the detected object is in proximity to the mobile phone 100, which has been stored beforehand in the ROM 190, the determination module 430 determines that the detected object is in contact with or proximity to the mobile phone 100. On the other hand, if the illuminance detected by the illuminance sensor has changed to a value outside the allowance value stored beforehand in the ROM 190, the determination module 430 determines that the detected object is not in proximity to the mobile phone 100.

Although a slidable mobile phone has been described as an example, a mobile phone with a rotatable first housing and second housing or a mobile phone with a foldable first housing and second housing may be applied. Also, a mobile phone 100 comprising a first housing, not comprising a second housing, may be applied.

Although the back light is turned ON in the processing of task S234, the luminance in this case may be a luminance lower than the predetermined luminance. For the case in which the screen 2 is displayed, the screen may be displayed with a lower luminance than when displaying the screen 1. According to the above configuration, by displaying the screen with lower luminance than the predetermined luminance, the power consumption during the telephone call can be reduced.

In FIG. 5A, the detection range may be only the portion below the character displayed as "Volume." In FIG. 5B, the detection range may be only the portion below the character displayed as "Brightness." In another embodiment, the detection range may be stored in the detection range data and may be set as necessary according to the information to be displayed. As described above, by restricting the detection range of the screen, unintentional input by the user when using the mobile phone 100 while placing it against the ear can be prevented.

The communication method of the mobile phone 100 comprises, for example but without limitation, Third Generation Partnership Project Long Term Evolution (3GPP LTE)™, Third Generation Partnership Project 2 Ultra Mobile Broadband (3 Gpp2 UMB)™, Time Division-Synchronous Code Division Multiple Access (TD-SCDMA)™, and Wireless Interoperability for Microwave Access (WiMAX)™, and other usually used communication protocols.

The telephone call processing program 320 may be stored in a server for data distribution and distributed to the mobile phone 100 via a network. The above program may be sold or distributed by being stored in a storage medium such as an optical disk including CD, DVD, BD, etc., a USB memory, a memory card, etc. The above program stored in the server or storage medium may be in a state executable by the mobile phone 100 that requires the same configuration as the mobile phone 100. In such a case, an effect that is the same as that described in the present embodiment can be obtained.

In this document, the terms "computer program product", "computer-readable medium", "computer readable storage medium", and the like may be used generally to refer to media such as, for example, memory, storage devices, or storage unit. These and other forms of computer-readable media may be involved in storing one or more instructions for use by the control module 220 to cause the control module 220 to perform specified operations. Such instructions, generally referred to as "computer program code", "computer-executable instructions", or "program code" (which may be grouped in the form of computer programs or other groupings), when executed, enable a method of using a system.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future.

Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the present disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent. The term "about" when referring to a numerical value or range is intended to encompass values resulting from experimental error that can occur when taking measurements.

The invention claimed is:

1. A portable electronic device, comprising:
  a display module operable to display a first screen comprising a first image corresponding to a first function;
  a touch panel operable to detect a touch contact by a user thereon;
  a proximity detection module operable to detect an object of a user when the object is in contact with the portable electronic device; and
  a control module operable to:
    execute the first function;
    display the first screen with a first luminance when the object is not detected while the first function is being executed;
    display a second screen with a second luminance lower than the first luminance when the object is detected while the first function is being executed, the second screen comprising a predefined area, and a second image corresponding to a second function; and
    determine the touch contact is one of:
      a valid contact if a touch location of the touch contact is in the predefined area; and
      an invalid contact if the touch location is outside the predefined area;
    change the second luminance to a third luminance of the second screen when the touch contact is the valid contact during execution of the first function while the second screen is displayed, wherein the third luminance is higher than the second luminance; and
    execute the second function in response to the valid contact during execution of the first function while the second screen is displayed.

2. The portable electronic device according to claim 1, wherein the predetermined function comprises at least one member selected from the group consisting of: a telephone call function, music replay function, recorded message replay function, message recording function, answering machine replay function, answering machine recording function, and volume adjusting function.

3. The portable electronic device according to claim 1, wherein the first function comprises adjusting a luminance of a screen.

4. The portable electronic device according to claim 1, further comprising a speaker operable to output a sound outside, wherein the first function comprises adjusting a volume of the sound.

5. The portable electronic device according to claim 1, wherein the second function comprises ending a telephone call.

6. The portable electronic device according to claim 1, wherein the control module is further operable to turn off the display module when no touch contact is detected for a predetermined period of time while the second screen is displayed.

7. The portable electronic device according to claim 1, further comprising a memory operable to store the predefined area.

8. A method for operating a portable electronic device comprising:
  executing a first function;
  detecting an object of a user when the object is in contact with the portable electronic device to provide detection results;
  display a first screen with a first luminance when the object is not detected while the first function is being executed, wherein the first screen comprises a first image corresponding to a first function; and
  display a second screen with a second luminance lower than the first luminance when the object is detected while the first function is being executed, wherein the second screen comprises a predefined area;
  detecting a touch contact on a touch panel by a user;
  determining the touch contact is one of:
    a valid contact if a touch location of the touch contact is on or inside the predefined area; and
    an invalid contact if the touch location is outside the predefined area;
  change the second luminance to a third luminance of the second screen, wherein the third luminance is higher than the second luminance; and
  executing a second function in response to the valid contact when the first function is being executed while the second screen is displayed.

9. The method according to claim 8, wherein the predetermined function comprises at least one member selected from the group consisting of: a telephone call function, music replay function, recorded message replay function, message recording function, answering machine replay function, answering machine recording function, and volume adjusting function.

10. The method according to claim 8, wherein the first function comprises adjusting a luminance of a screen.

11. The method according to claim 8, further comprising outputting a sound outside, wherein the first function comprises adjusting a volume of the sound.

12. The method according to claim 8, wherein the second function comprises ending a telephone call.

* * * * *